March 18, 1924.
H. S. WILLIAMS
TILTABLE STEERING WHEEL
Filed Nov. 17, 1921     2 Sheets-Sheet 2
1,487,638
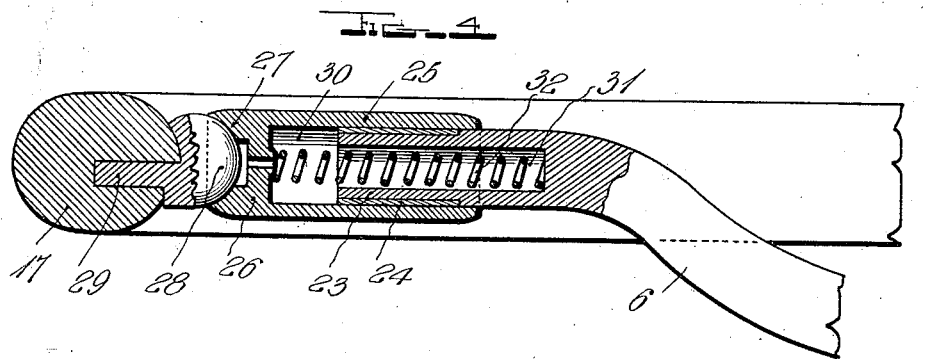
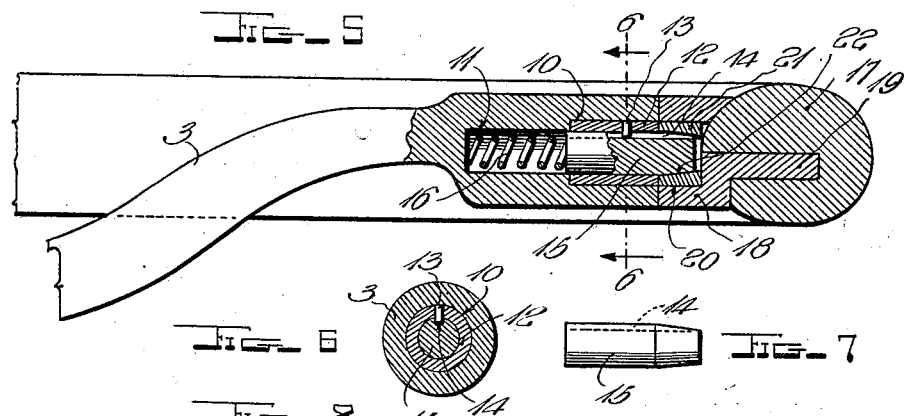
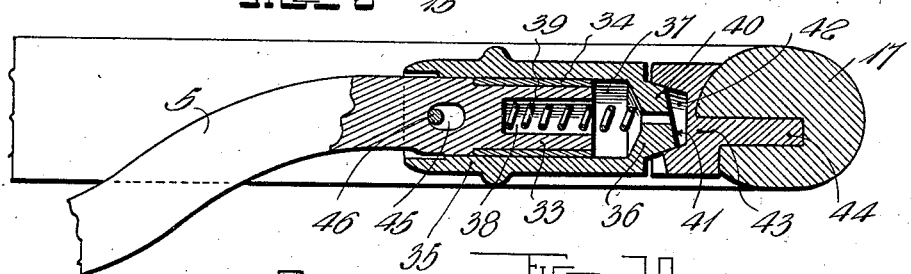
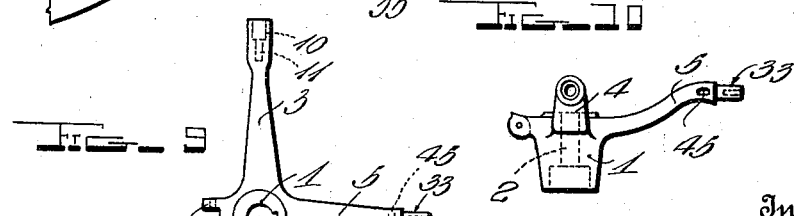
Inventor
Harry S. Williams
By *H. B. Wilson & Co.*
Attorneys Patented Mar. 18, 1924.

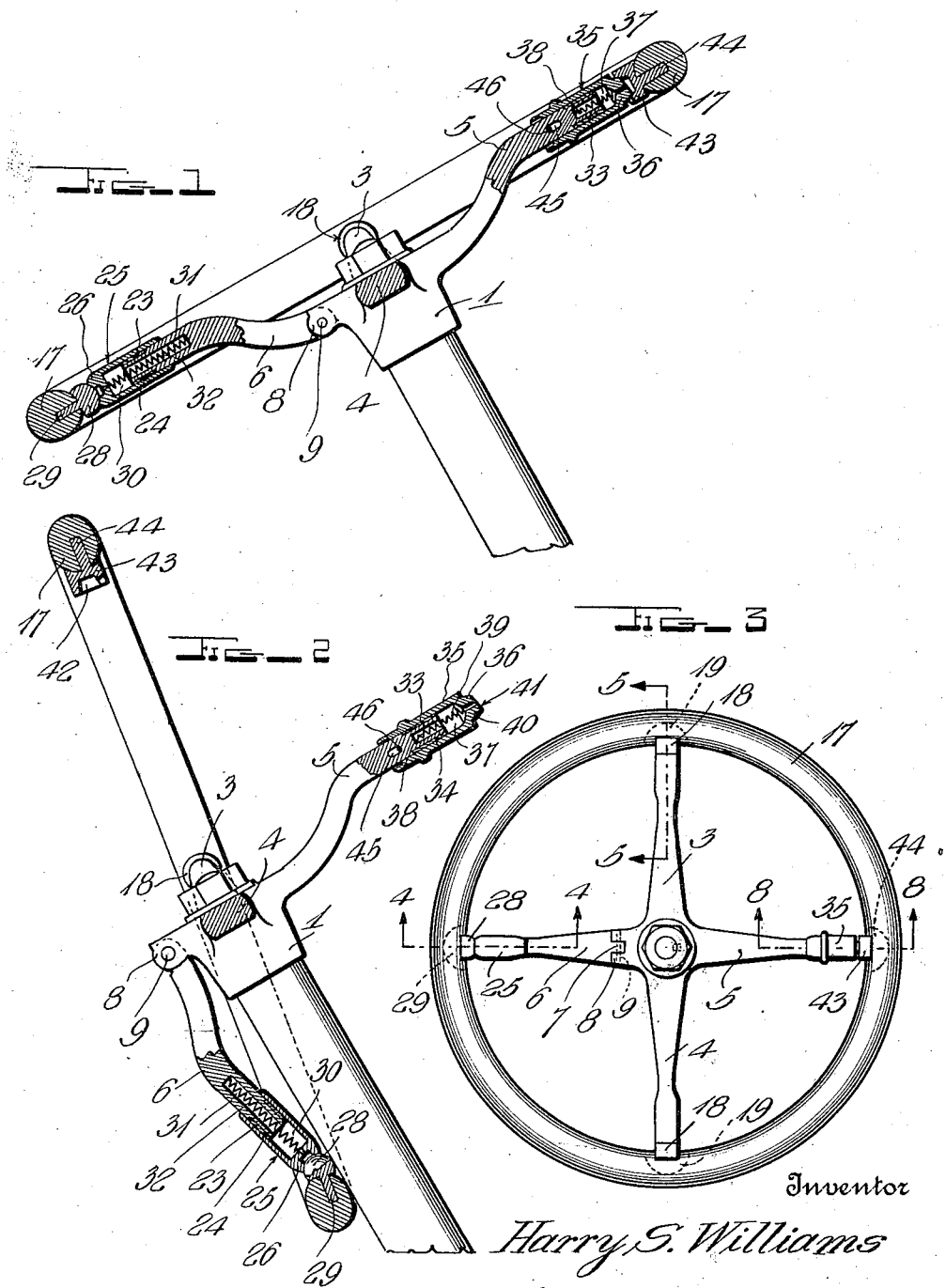

1,487,638

UNITED STATES PATENT OFFICE.

HARRY S. WILLIAMS, OF SAN ANTONIO, TEXAS, ASSIGNOR TO J. W. HEARD, OF SAN ANTONIO, TEXAS.

TILTABLE STEERING WHEEL.

Application filed November 17, 1921. Serial No. 515,894.

*To all whom it may concern:*

Be it known that I, HARRY S. WILLIAMS, a citizen of the United States, residing at San Antonio, in the county of Bexar and State of Texas, have invented certain new and useful Improvements in Tiltable Steering Wheels; and I do declare the following to be a full, clear, and exact description of the invention, such as will enable others skilled in the art to which it appertains to make and use the same.

This invention relates to steering wheels for automobiles, particularly to steering wheels which are designed to tilt or drop in order to provide additional room between the wheel and driver's seat so as to enable the driver to more freely enter and leave his seat.

The principal object of the invention is to provide a steering wheel of this character in which the rim of the wheel is pivotally mounted upon certain spokes of the spider and suported and locked in operative position by the other spokes, all of this being done in a novel and unique manner so that the wheel as a whole presents a very neat appearance and so that it is practically symmetrical.

Another object of the invention is to provide in a wheel of this character an improved means by which the rim may be locked positively in operative position, such means being so constructed that it may be easily operated to unlock the rim in order to tilt it to its inoperative position, and associated with this means is a spring means for automatically swinging the rim from inoperative to operative positions after it has been started manually.

A still further object of the invention is to provide in a wheel having a rim which is pivotally mounted upon the outer ends of a pair of spokes, an improved pivot construction, which in connection with the other spoke construction, enables the entire rim to be snapped in place upon the spider. This improved construction also compensates for wear on the parts by the swinging of the rim from operative to inoperative positions and vice versa, and thus it prevents lost motion and prevents the tiltable rim from rattling upon the spider.

An additional object of the invention is to generally improve upon wheels of this character by the provision of a comparatively simple, cheap and durable one, and one which will be efficient and reliable in operation and well adapted to the purpose for which it is designed.

The invention consists in the combination and arrangement of parts and novel features of construction which are hereinafter described and claimed and illustrated in the accompanying drawings.

In these drawings:

Figure 1 is a central vertical longitudinal sectional view of a wheel constructed in accordance with this invention, showing the wheel in operative or driving position.

Figure 2 is a similar view except that it shows the wheel in inoperative position.

Figure 3 is a plan view of the wheel.

Figure 4 is a detail vertical central longitudinal sectional view on a larger scale taken on the plane indicated by the line 4—4 of Fig. 3.

Figure 5 is a similar view taken on the line 5—5 of Fig. 3.

Figure 6 is a transverse sectional view of one of the spokes taken on the plane indicated by the line 6—6 of Fig. 5.

Figure 7 is an elevation of one of the pivot pins.

Figure 8 is a vertical longitudinal sectional view of the wheel taken on the plane indicated by the line 8—8 of Fig. 3.

Figure 9 is a top plan view of the spider casting, and

Figure 10 is a side elevation of the spider casting.

Referring more particularly to the drawings in which similar reference characters are used to designate like parts throughout the several views, the hub of the improved steering wheel is designated by the numeral 1. The hub 1 is provided with a centrally extending opening 2 adapted to receive the upper end of the steering shaft of an automobile, and is intended to be fixed upon the steering shaft in any suitable manner.

The spider of the wheel which is carried by the hub 1 consists of a pair of oppositely extending spokes 3 and 4, a forwardly extending spoke 5 and a rearwardly extending spoke 6. The spokes 3, 4 and 5 are formed integral with the hub 1, but the spoke 6, which extends oppositely from the spoke 5, is hingedly connected at its inner end to the hub 1. While any suitable form of hinge construction between the spoke 6 and the hub 1 may be used, yet it is preferable to provide the inner end of the spoke 6 with a longitudinally extending apertured lug 7 and the rear side of the hub 1 with a pair of spaced rearwardly extending apertured lugs 8. The lug 7 is designed to fit between the lugs 8 and to receive with the latter, a pivot pin 9.

The outer ends of the spokes 3 and 4, which are the two oppositely extending fixed spokes, are provided with longitudinally extending recesses 10, the inner ends of which are of reduced diameters as indicated by the numeral 11. Bushings 12 are fitted in the larger outer ends 10 of the recesses in the spokes 3 and 4. These bushings are provided with pins 13 which project inwardly into their longitudinal bores to be received in grooves 14 which are formed in the outer sides of pins 15 and which extend longitudinally. The pins 15 are disposed in the bores of the bushings 12 and are permitted to slide longitudinally in said bores and also in the inner ends 11 of the recesses in the spokes 3 and 4, but are projected outwardly beyond the ends of the spokes by means of coil springs 16 which are disposed in the reduced portions 11 of the recesses and confined between the bottoms of the recesses and the inner ends of the pins 15.

The opposite sides of the rim of the steering wheel which is designated by the numeral 17 carries socket members 18. These members 18 are constructed with attaching plates 19 which are embedded into the rim 17 and secured thereto in any suitable manner. The recesses 20 in the socket members 18 are provided with bushings 21, the bores of which are tapered as indicated at 22. The outer ends of the pins 15 which project beyond the ends of the spokes 3 and 4 are also tapered to correspond with the internal taper of the bushings 21 and to fit into said bushings. By this construction, wear compensating pivots are formed between the outer ends of the spokes 3 and 4 and the opposite sides of the rim 17, as the wear of the parts will fall upon the tapered ends of the pins 15 and the tapered bores of the bushings 21, which parts are maintained in tight but yieldable engagement by the coil springs 16.

The outer end of the hinged spoke 6 is of cylindrical shape in cross section and is provided with a portion 23 of reduced diameter. Fitted upon this reduced portion 23 is a bushing 24. Slidable upon the bushing 24 and the cylindrical outer end portion of the spoke 6 is a sleeve 25, the outer end of which is provided with a head 26 having a concaved outer face 27. This concaved face or socket 27 receives a partially ball-shaped or spherical-shaped member or head 28 which is carried by the rim 17. This member or head 28 has preferably integrally formed therewith a lug 29 which is embedded in the rim 17 and secured thereto in any suitable manner. Disposed in the hollow portion 30 of the sleeve 25 and a deep longitudinally extending recess 31 formed in the outer end of the spoke 6 is a coil spring 32. This coil spring is confined between the bottom of the recess 31 and the inner face of the head 26 of the sleeve 25 so that as the sleeve 25 slides upon the outer end of the spoke 6, the concaved face 27 of the head will be maintained in relatively tight contact with the ball or spherical-shaped member or head 28.

The outer end of the fixed spoke 5 is also of cylindrical shape in cross section and has a portion 33 of reduced diameter upon which is fitted a bushing 34. Slidable upon the bushing 34 and the cylindrical portion of the spoke 5 is a sleeve 35, the outer end of which is provided with a head 36. Disposed within the hollow 37 of the sleeve 35 and a longitudinally extending recess 38 formed in the free end of the spoke 5 is a coil spring 39. This coil spring 39 is confined between the bottom of the recess 38 and the inner face of the head 36 and serves to project the sleeve 35 outwardly.

Projecting centrally from the outer face or side of the head 36 of the sleeve 35 is a tapered lug 40, the free end of which is cut off angularly or upon an incline as indicated by the numeral 41.

The lug 40 is adapted to fit into the tapered socket 42 of a socket member 43 which is carried by the rim 17. Preferably the socket member 43 has integrally formed therewith a lug 44 which is embedded into the rim 17 and secured thereto in any suitable manner.

To prevent the sleeve 35 from rotating upon the outer end of the spoke 5, the latter is provided with an enlongated transversely extending opening 45, and the sleeve carries a transversely extending pin 46 which runs through this opening.

With the steering wheel in operative position, that is, with the lug 40 fitting into the socket 42 so that the parts are locked in this position, and it is desired to tilt the rim of the wheel, so as to provide additional room between the wheel and the driver's seat to enable the driver to more freely enter and leave his seat, it is only necessary to move the sleeve 35 rearwardly or inwardly until the lug 40 is retracted clear of the socket 42. As soon as this is done, the rim 17 may be bodily tilted or dropped from the position shown in Fig. 1 to the position shown in Fig. 2. In tilting in this manner, the spoke 6 will swing upon its hinged connection at its inner end with the hub 1, and since the axis of this hinge is offset from the axis of swing of the rim, as the rim is swung to inoperative position, the distance between the hinge and the ball or spherical-shaped member or head 28 will be decreased and the sleeve 25 under the tension of the spring 32 will slide upon the free end of the hinged spoke 6. The rim 17 in moving from its operative to its inoperative position will swing bodily upon its pivotal connection with the outer ends of the fixed spokes 3 and 4. The spring 32 being constantly under tension and being put under more tension as the rim is tilted or dropped toward inoperative position, will automatically move the rim to extreme tilted position after the rim has been tilted until the head 28 has passed beyond the dead center line passing through the axes of the pivot pins 15 and the hinge at the inner end of the spoke 6. The spring 32 will then maintain the rim in its extreme tilted or inoperative position.

In order to move the rim from inoperative to operative position, it is only necessary to grasp the lowermost edge or side of the rim and swing it upwardly until the head 28 has passed beyond the aforesaid dead center line. The spring 32 will then act so as to automatically swing the rim to its operative position. When, as the rim swings to its operative position, the lower portion of the socket member 43 engages the lug 40, the latter and the sleeve 35 which carries the same will be slid rearwardly or inwardly automatically owing to the angularly cut off face 41 of the lug and thus the latter under the tension of the spring 39 will snap into the socket 42 when it is opposite said socket.

Owing to the fact that the lug 40 and the socket 42 are correspondingly tapered and also to the fact that the sleeve 35 which carries the lug 40 is pressed outwardly by the spring 39, a tight fit will always be maintained between the outer end of the spoke 5 and the rim 17 and thus rattling of the parts at this point cannot take place. For a similar reason, the connection between the outer ends of the spokes 3 and 4 and the rim will always be maintained tight and no rattling of the parts at these points will take place. Likewise, since the sleeve 25 carried at the outer end of the spoke 6 is pressed outwardly by the spring 32 in engagement with the ball or spherical-shaped member or head 28, the connection of the outer end of the spoke 6 with the steering wheel rim will be maintained tight at all times and rattling of the parts at this point will be prevented.

The whole rim and the whole spider are preferably assembled as separate units, and are preferably fitted together by first bringing these units together so that the head 28 will be disposed in the socket 27, and then by moving the two units relatively while the rim is held in its relatively tilted position and the pins 15 are held retracted until these pins are opposite the recesses 20 when they are released and allowed to snap into the recesses. The rim may then be swung to operative position under the tension of the spring 32.

From the foregoing description, taken in connection with the drawings, the construction, use and operation of the invention will be readily understood without a more extended explanation.

While the construction shown in the drawings and described in the foregoing is thought to be best suited for carrying out the objects of the invention, yet it is apparent that various changes in form, proportion, and in the details of construction may be made without departing from the spirit and principle of the invention, and hence it is to be understood that such changes may be made within the scope of the invention as it is claimed.

What is claimed is:

1. A steering wheel comprising a spider including a hub having pairs of opposed spokes radiating therefrom, one pair of said spokes being rigid with the hub, one of the spokes of the other pair being also rigid with said hub and the remaining spoke being hinged thereto, a tiltable rim pivotally connected to the outer ends of the first named pair of spokes, an extensible member mounted on the outer end of said hinged spoke and hingedly connected with said rim, and a quick releasable retaining device cooperative with the outer end of the remaining spoke and said rim.

2. A steering wheel comprising a spider including a pair of spokes, and a tiltable rim pivoted upon said spokes, the pivot joints between the rim and said spokes including sockets and spring projected pivot pins, whereby the spider and the rim may be fastened together by moving them relatively while said pins are maintained retracted until the latter are opposite said sockets, when they will snap into said sockets upon being released.

3. A steering wheel comprising a spider including a pair of rigid spokes and a hinged extensible spoke, a rim, pivot joints between the outer ends of the rigid spokes and said rim, and a hinged joint between the outer end of said hinged spoke and said rim, said hinged joint being separable and said pivot joints including spring-projected pivot pins and sockets therefor, whereby the spider and rim may be fastened together by first engaging the hinged joint and then moving the spider and the rim relatively while said pins are maintained retracted until the latter are opposite said sockets, when they will snap into said sockets upon being released.

4. A steering wheel comprising a spider including a pair of spokes, and a tiltable rim pivoted upon the outer ends of said spokes, the pivot joints between said rim and said spokes including sockets disposed in the rim and spring-projected pivot pins carried by the spokes, whereby the spider and the rim may be fastened together by moving them relatively while said pins are maintained retracted until the latter are opposite said sockets, when they will snap into said sockets upon being released.

5. A steering wheel comprising a hub, a tiltable rim, a spoke hinged at one end to said hub, spring means associated with the opposite end of said spoke for automatically moving said rim toward its extreme tilted position at a predetermined time when it is tilted by hand, and means independent of said spoke for locking the rim in operative position.

6. A steering wheel comprising a hub section, a tiltable rim section, an extensible spoke hinged to the hub section and the rim section, spring means associated with said spoke for moving the rim section from partially tilted to extreme tilted positions and maintaining it in its extreme tilted position, and means independent of said spoke for locking the rim in operative position.

7. A steering wheel comprising a hub section, a tiltable rim section, an extensible spoke hinged to the hub section and rim section, spring means associated with said spoke for moving the rim section from partially tilted position to operative position and for moving the rim section from partially tilted position to extreme tilted position and for maintaining the rim section in extreme tilted position, and means independent of said spoke for locking the rim section in operative position.

8. A steering wheel comprising a spider section including a rim supporting and locking spoke, a tiltable rim section mounted upon said spider section, and co-operating latch means at the outer end of said spoke and said rim for locking the latter in operative position, said means including a spring projected latch having a tapered lug, and a tapered socket into which said lug fits.

9. A steering wheel comprising a spider section including a rim supporting and locking spoke, a tiltable rim section mounted upon said spider section, said rim section being provided opposite the outer end of said spoke with a tapered socket, and a spring-projected slidable latch carried by the outer end of said spoke and having a tapered lug seatable in said socket to lock the rim section in operative position.

10. A steering wheel comprising a spider section including a rim supporting and locking spoke, a tiltable rim section mounted upon said spider section and being provided at a point opposite the outer end of said spoke with a tapered socket, a spring projected sleeve slidably mounted upon the outer end of said spoke, and a lug projecting from said sleeve and seatable in said socket to lock the rim section in operative position, said lug being tapered to correspond with the taper of said socket to compensate for wear and to prevent rattling of the parts at this point.

11. A steering wheel comprising a spider including a pair of rigid spokes, a tiltable rim section pivoted to said spokes, the pivots between said spokes and said rim section including tapered sockets and spring-projected tapered pins seatable in said sockets to compensate for wear and to prevent rattling of the parts at said pivots, and means for locking the rim section in operative position.

12. A steering wheel comprising a spider including a pair of rigid spokes, and a tiltable rim section pivoted to the outer ends of said spokes, the pivots between said rim and said spokes including sockets disposed in the rim and spring-projected pivot pins mounted upon the ends of said spokes, said sockets and said pins being correspondingly tapered to compensate for wear and to prevent rattling of the parts at said pivots, and means for locking the rim section in operative position.

13. A steering wheel comprising a spider including a pair of oppositely extending rigid spokes, another rigid spoke and a hinged spoke, a rim pivotally mounted upon the outer ends of said oppositely extending rigid spokes and tiltable bodily from operative to inoperative positions, a pivotal connection between the outer end of said hinged spoke and said rim, and co-operating means carried by the outer end of the remaining spoke and said rim to lock the latter in operative position, said connection and said means and also the pivotal connections between said rim and the outer ends of said oppositely extending rigid spokes being yieldable and extensible to compensate for wear and to prevent rattling of the parts.

14. In a tilting steering wheel, a spider having diametrically opposed rigid spokes, and an intermediate rigid spoke, a rim pivoted to the opposed rigid spokes, said spider also including a hinged spoke, and means interposed between the outer end of the latter and said rim to automatically snap the latter from a partially tilted position to its extreme tilted position.

15. The structure specified in claim 14, wherein said means comprises an extensible spring pressed part mounted on the outer end of the hinged spoke and having hinged connection with said rim.

16. A tiltable steering wheel comprising a spider including a hub having pairs of diametrically opposed spokes radiating therefrom, three of said spokes being rigid and one of said spokes being hingedly connected with the hub, a rim having pivotal connection with the outer ends of one pair of the opposed rigid spokes, a connecting member telescopically mounted on the outer ends of said hinged spoke, spring means associated with said member for exerting an outward yielding thrust thereon, and a ball and socket joint between said member and rim.

17. A tiltable steering wheel comprising a spider embodying a hub having a plurality of spokes radiating therefrom, all of said spokes but one being rigid, and said one spoke being hingedly connected with said hub, a sleeve telescopically mounted on the outer end of said hinged spoke, spring means exerting an outward thrust on said sleeve, the latter being provided in its outer end with a socket, and a ball joining member mounted on said rim and movably seated in said socket.

18. A tiltable steering wheel comprising a rim having a plurality of circumferentially spaced abutments mounted on its inner periphery, and a spider including a hub having a plurality of diametrically opposed pairs of spokes radiating from said hub, said spokes being provided on their outer ends with a yieldable means having quick attachable engagement with said abutments to facilitate connection of the rim with the spider.

In testimony whereof I have hereunto set my hand.

HARRY S. WILLIAMS.